Nov. 27, 1962 G. VON WRANAU 3,065,613
APPARATUS FOR PRODUCTION OF GLASS FIBERS
Filed May 5, 1960 3 Sheets-Sheet 2
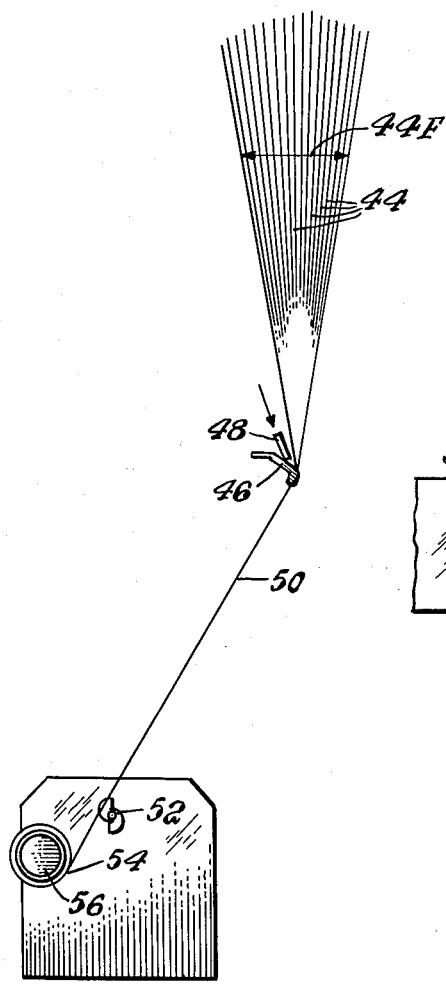
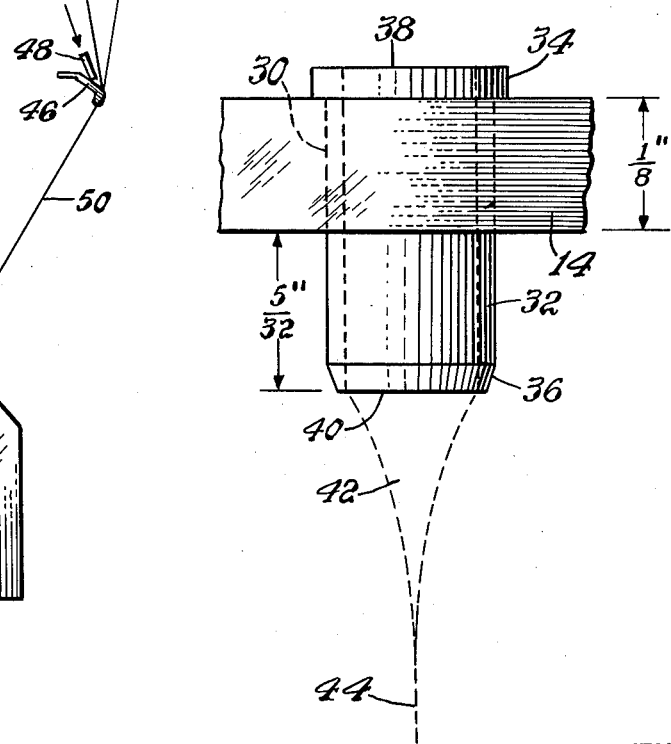
INVENTOR.
Guido von Wranau
BY

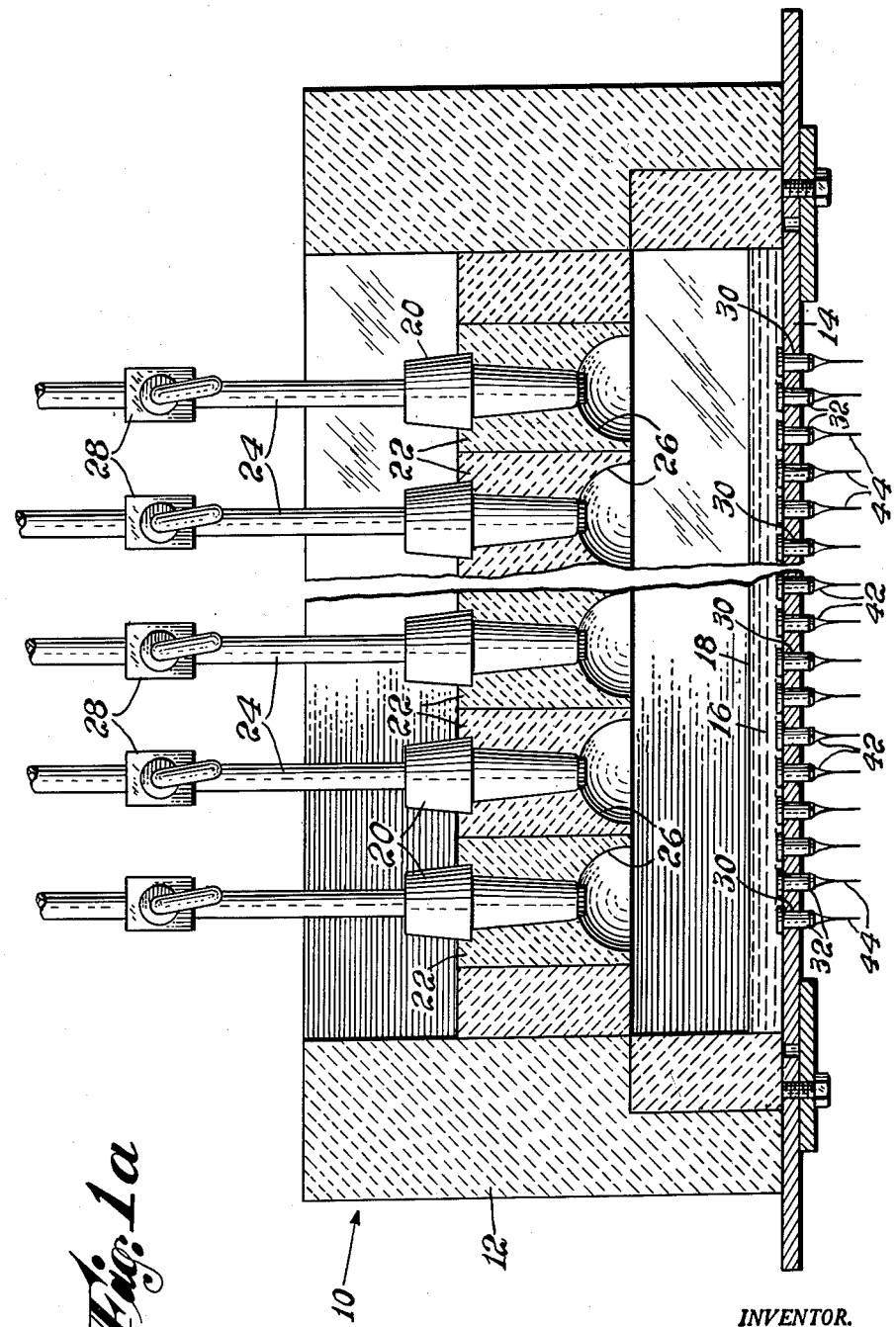

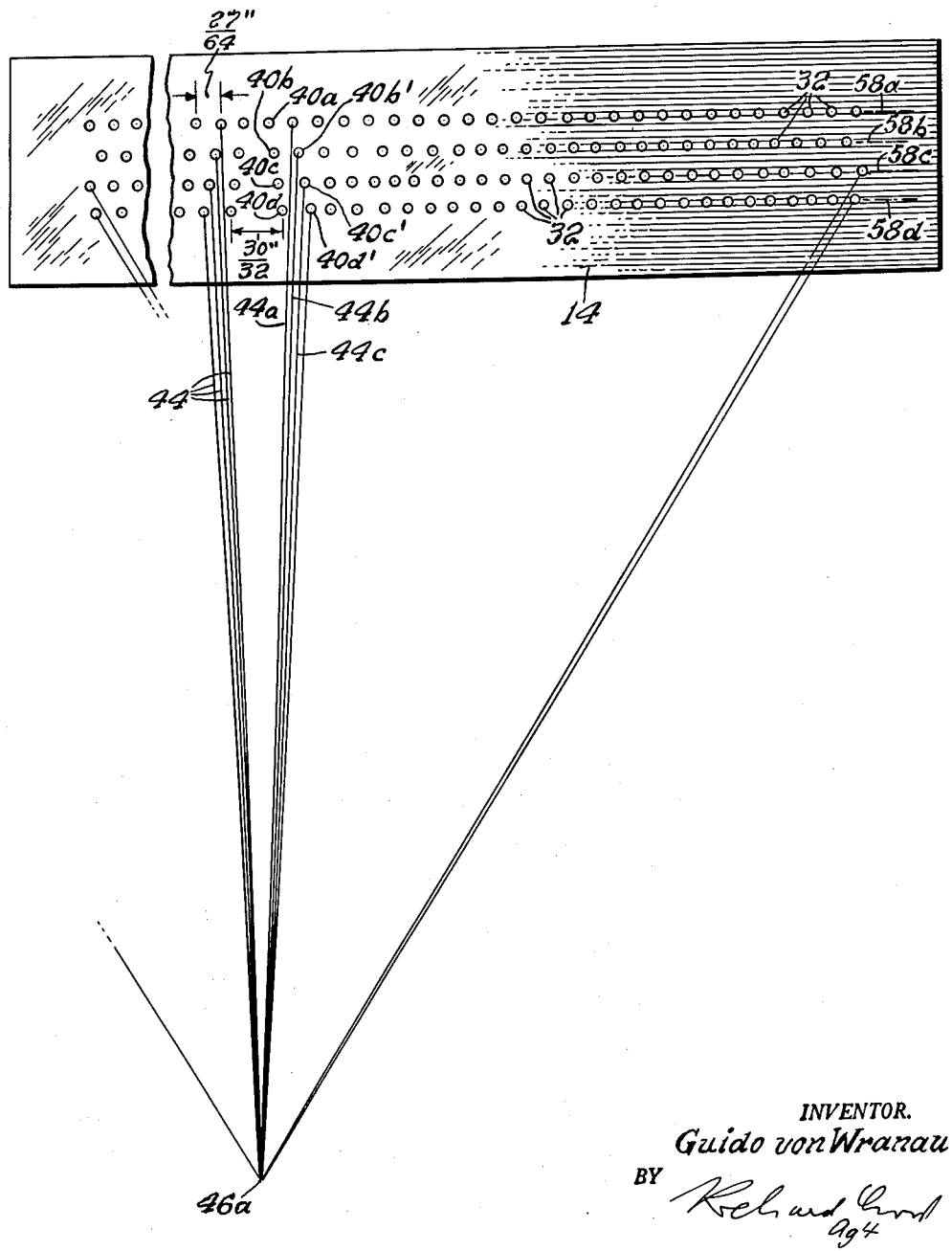

United States Patent Office 3,065,613
Patented Nov. 27, 1962

3,065,613
APPARATUS FOR PRODUCTION OF GLASS FIBERS
Guido von Wranau, 247 E. 9th St., Plainfield, N.J.
Filed May 5, 1960, Ser. No. 27,150
3 Claims. (Cl. 65—81)

This invention relates to the production of fibers of siliceous materials such as glass, and more particularly to improved apparatus for forming such fibers.

The invention, although applicable to the production of different types of fibrous glass, is described in connection with the production of continuous fibers, whereby streams of glass are attenuated mechanically into fine, uniform diameter filaments, the filaments are gathered into a strand, and the strand is wound into a package for subsequent processing.

The primary object of this invention is to provide means for forming continuous glass fibers in a more efficient, reliable, and economical way.

It will be apparent that a more fluid condition of the glass to be fiberized is desirable and that a state of lower viscosity is achieved by the use of higher temperatures. Lower viscosity is of great advantage since it will greatly assist in the refining of the glass, that is, the freeing of the glass from bubbles, streaks, and the like. Also, reduced viscosity will contribute to a smoother fiber-forming operation and the formation of a more perfect fiber surface. However, the height of the temperatures to which glass can be heated to ensure lower viscosity or greater fluidity is limited by the rate of cooling, which can be attained immediately before the streams of glass referred to hereinbefore are attenuated. It is, therefore, an object of my present invention to provide greater efficiency in cooling the glass immediately before attenuating.

It will be appreciated that the formation of a fiber, that is, the transmittal of the mechanical attenuation forces from the fiber to the stream of glass is primarily related to the viscosity of the glass. For instance, uniformity of the diameter of a fiber can only be accomplished if a certain range of viscosity is maintained. Both above and below this range, proper fiberization is difficult, if possible at all. To stay strictly within the viscosity range established for a given glass, and thus to ensure proper fiberization, it is necessary to expose the glass to the least possible temperature variation. Accordingly, it is another object of the invention to make the rate of cooling more certain and to render fiberization independent from noncontrollable conditions, such as random conditions of the atmosphere.

Associated with the foregoing objects is the important object to make the formation of fibers of great uniformity possible in a more reliable way. The invention achieves the greatest possible uniformity in fiber diameter and internal structure.

In the production of continuous glass fibers, it is known to use orifice plates. Such plates are mostly electrically heated but may be differently heated as well. The orifice plate forms ordinarily the bottom of a container holding glass in a molten state. Glass flows through the orifices, and each stream of glass, when it has left the respective orifice and has been cooled to the fiber-drawing temperature, is attenuated into a fiber. Up to now, operating difficulties were encountered with orifice plates provided with three or more lengthwise extending rows of orifices, which is apparently due to the fact that glass streams emerging from the inner rows cannot dissipate heat as readily as those emerging from the outer rows and thus cannot cool to the proper fiber-drawing temperature. One object of the present invention is to provide an orifice plate that ensures more efficient cooling of all the glass streams and makes the provision of more rows of orifices possible than could be provided in the past.

There are orifice plates known in which the orifices are formed in tips through which the glass flows before it is emitted to the atmosphere, which tips assist in dissipating heat from the glass. Upon emission, each of the streams of glass, leaving a tip, forms a cone-shaped body, from the apex of which a fiber is drawn. It has already been suggested, in the production of glass fibers, to maintain a suitable environment in the attenuating zone by providing cooling plates parallel to the orifice plate or cooling fins to extend between rows of tips. Such suggestions imply added complicated structure, such as conduits for the coolant and means to support the conduits and to control the flow of the coolant. The present invention aims at doing away with such structure and yet at achieving satisfactory cooling.

Further objects of my invention center about an orifice plate of the simplest possible construction, to be heated by radiant heat, and to ensure a maximum of uniform cooling and thereby a minimum of fiber breaks.

Other objects of the invention will appear from the following description. The specification is accompanied by drawings in which FIGS. 1a and 1b are a fragmentary vertical section through a glass furnace, including an orifice plate embodying features of the invention, also illustrating the attenuation of fibers, the gathering of the latter into a strand, and the winding of the latter by a winder;

FIG. 2 is a fragmentary elevational view to enlarged scale of an orifice plate and a nipple passing through an orifice of the plate, also illustrating a cone-shaped body of glass as it depends from the nipple shown; and FIG. 3 is a plan view of an orifice plate, with the nipples being shown, for reasons of simplicity by single circular lines.

Referring to the drawings in greater detail, and initially to FIG. 1a, refined and homogenized glass is collected in a section of a glass furnace, generally designated 10. This section is made of refractory material 12 and has as its bottom an orifice plate 14 made of known commercially available types of alloys resistant to high temperatures and oxidation, for instance "Nichrome," "Viscotherm," alloys of the latter name being offered by Kelsey-Hayes Company, New Hartford, N.Y. The body 16 of glass above the plate 14 may be of very low height, the glass level being identified by 18. Reference is made to my copending application Serial No. 824,977, filed July 6, 1959, in which the height of a glass body above an orifice plate is stated to vary between about ⅛ and ⅝ of an inch. The temperature in the section 10 which constitutes the attenuating zone of the furnace is kept so as to allow fibers to be drawn. In the construction of FIG. 1a, as selected for illustration, the heat used is radiant heat, preferably derived from a gaseous fuel mixture. Five radiant heat type burners 20 are shown to be spacedly arranged along the longitudinal axis of the plate 14. Each of the burners is shown to be sealed in a single block 22 of refractory material and is connected by a conduit 24 to a suitable source (not shown) of a fuel mixture, for instance, of combustible gas and air. The fuel mixture is burned in radiators 26 which consist of cup-shaped cavities in the refractory blocks. The radiant heat heats the interior walls of the section 10, the body of glass therein, and, through said glass body, the plate 14. Each conduit 24 is provided with a cock 28 to control the pressure and rate at which the final mixture is supplied. The burners are mounted to be rather close to the glass surface and to fully control the heat and viscosity of the glass. The distance between the radiators 26 and the glass level is, for instance, approximately 4 to 5 inches.

The plate is assumed to have 204 orifices 30. With this number provided in four rows, there are 50 orifices in each of two rows and 52 orifices in each of the other two rows. FIG. 1a showing the plate in its longitudinal extent, the orifices indicated are intended to represent the number of 50 and 52.

Having now reference to FIG. 2, a nipple 32 is passed through an orifice 30 of the plate 14. The nipple has a flange 34 at one end to support the nipple in the orifice, and a chamfer 36 at its other end. With the use of the nipples of the invention, it is the orifice 38 in the nipple through which glass enters the nipple, and the orifice 40 from which a stream of glass is emitted to the atmosphere. The orifices 38 and 40 are in the order of .02″ to about .125″ in diameter, whereas the orifices 30 in the plate are slightly larger in diameter. The nipples are made of a very thin section of a high temperature and oxidation resistant alloy, for instance, "Nichrome." With a nipple bore of .125″, the outer diameter of the nipple has a diameter, for instance, of .177″.

The stream of glass, as it emerges from an orifice 40, forms a body 42 of glass of cone shape, from the apex of which a fiber 44 is drawn, the cone-shaped body 42 and the fiber 44 being shown in dotted lines.

Reverting to FIG. 1a and referring at the same time to FIG. 1b, fibers 44 are drawn to a member 46 where the fibers are gathered and a sizing fluid is applied to the fibers through a tube 48 from a tank not shown. A strand 50 thus formed is collected, with the aid of a traversing device 52, on a tube 54 rotatably mounted on a collet 56. The fiber packages obtained are withdrawn to be processed, for instance, into yarns, cords, and other forms, and to be used in a wide field of applications.

The plate 14, as shown in FIG. 3, is provided with 204 orifices, with each nipple 32 passing through an orifice being indicated by a single circular line. Each of the rows 58a and 58b contains 50 orifices, whereas each of the rows 58c and 58d contains 52 orifices. The gathering point at the gathering member, the latter being not shown in FIG. 3, is designated 46a. It will be seen that, according to the invention, the orifices are so arranged that no two lines 44, all of which constitute fibers drawn from the orifices, coincide. In the attenuation of fibers by mechanical means, gathering means are usually provided below the orifice plate and, at the same time, outside the space directly beneath the orifice plate. Thus, the fan of fibers 44F (see FIG. 1b) emitted from the plate 14 converges downwardly and sideways. With the arrangement of the orifices as shown, it will be seen that the fiber 44a emitted from the orifice 40a of the row 58a passes between the orifices 40b and 40b′ of the row 58b, that both the fiber 44a, on its continued path, and the fiber 44b emerging from 40b′, pass between 40c and 40c′ of row 58c, and that, finally, fibers 44a, 44b, as well as fiber 44c emitted from 40c′, pass between 40d and 40d′ of row 58d. The arrangement shown has the most beneficial effect that a drop of glass from any place of the plate, upon the break of a fiber, will, on its fall to the floor of the working place, not hit another fiber and thus cause another fiber to break.

It is to be noted that the arrangement of FIG. 3 is shown by way of example. There is a multitude of other arrangements possible, all within the scope of this invention, one basic aspect of the invention being that no two lines representing fibers of what is referred to as the fan of fibers, when considered in a plan view, will coincide. Additionally, it is preferred that such fiber-representing lines, wherever they cross a row of orifices other than the starting row, will not intersect an orifice.

In the arrangement of FIG. 3, the orifice plate may have a length of 26″, a width of 4″ and a thickness of an 1/8″. In the row 58a, each two adjacent nipple orifices are 27/64″ apart from each other, measured from center to center of the orifices. In the rows 58b, 58c and 58d, too, two adjacent nipple orifices are 27/64″ apart from each other, except that the distance between the two central orifices is larger. For example, the distance between the two central nipple orifices in row 58d is 30/32″. Adjacent rows of orifices are 1/2 of an inch apart from each other.

With the nipple orifices being, for instance, 1/8″ in diameter, and the distance between two nipple orifices being assumed to be 27/64″, it will be clear that two points in the circumferences, for instance, of the orifices 40d and 40d′, nearest to each other, are 19/64″ apart from each other (27/64 minus 8/64), that is more than twice or almost three times the diameter of an orifice.

From the arrangement of the orifices, as shown in FIG. 3, it will further be seen that the relatively large distance between the nipples in the orifice plate produces relatively wide air channels. Natural air currents flowing through these channels act like a coolant and carry heat dissipated by the nipples quickly away, thus being responsible for a much more efficient cooling than could be achieved up to now without the use of circulated or sprayed liquid coolants.

It is believed that the construction and operation of a preferred form of apparatus for practicing the invention, as well as the many advantages thereof, will be clearly understood from the foregoing detailed description. Some of the features of the invention are pointed out or reviewed hereinafter.

Aside from the function of the referred to relatively wide air channels allowing air to pass freely therethrough and thus to produce most desirable temperature differentials between the glass emitted from the nipples and the circulating air, the wide air channels also serve to prevent the formation of undesired air currents which are created by close arrangements of tips and lead to noncontrollable erratic variations in the temperature and therefore viscosity of the glass.

The nipples are made of thin material, and, in addition, they are provided with a chamfer as the one designated 36. The thinness of the nipple material, as well as the chamfer, also contribute to quicker heat losses from the cone-shaped glass bodies and to more efficient cooling of the cones.

The invention, in cooling the cones more efficiently than could be done in the past, makes it possible to heat the glass to be fiberized to a greater fluidity and to have all the benefits associated therewith, such as smoother fiber formation, smoother fiber surface, and a stronger and more uniform fiber.

To enhance the reduction of fiber breaks, I provide that the lines bounding each two adjacent orifices in my orifice plate be a distance apart from each other, which is at least approximately as long as the chord passing through the center of an orifice. In the case of circular orifices, the centers of each two adjacent orifices are a distance apart from each other at least approximately twice the orifice diameter. With the provision of rows of orifices, this is true for adjacent orifices in the same row, as well as for adjacent rows. The distribution of the orifices with respect to each other, according to the invention, depends on the number of rows of orifices. The important requirement of the invention is an arrangement whereby, as has been explained, no two lines of those representing fibers of the fan, in a plan view, will coincide, or whereby no vertical through an orifice in the orifice plate will intersect any of the fibers of the fan, which makes sure that a drop of glass, caused by a fiber break, will not cause another break. It will readily be appreciated that the arrangement of the orifices in the plate cuts the number of breaks considerably.

It will be apparent that while I have shown and described my invention in one form only, many changes and modifications may be made without departing from the spirit of the invention defined in the following claims.

I claim:

1. In an apparatus for producing glass fibers, platelike means provided with at least three rows of orifices through each of which a stream of glass is downwardly emitted, and means for attenuating the streams of glass to fine fibers, the attenuating means including means for gathering the fibers to form a strand therefrom, the gathering means being mounted to form a fan of fibers between the orifices and the point of gathering the fibers, the gathering point being outside a space directly underneath the platelike means, the orifices being arranged so that out of lines representing the fibers of the fan, when considered in a plan view, no two lines will coincide and thus no line will intersect an orifice.

2. In the apparatus according to claim 1, a plate of longitudinal shape serving as said platelike means and being provided with four lengthwise extending rows of orifices, the orifices being circular in shape, the centers of most pairs of two adjacent orifices in the same row being a distance apart from each other approximately three times the orifice diameter, and two adjacent rows of orifices being a distance apart from each other approximately four times the orifice diameter.

3. In the apparatus according to claim 1, a plate of longitudinal shape serving as said platelike means, the orifices being arranged in a staggered relationship with respect to the fiber-representing lines of the fan.

References Cited in the file of this patent

UNITED STATES PATENTS

| | | |
|---|---|---|
| 2,255,426 | Lamesch | Sept. 9, 1941 |
| 2,489,243 | Stalego | Nov. 22, 1949 |
| 2,711,054 | Urbanetti | June 21, 1955 |
| 2,728,699 | Labino | Dec. 27, 1955 |
| 2,931,062 | Leaman | Apr. 5, 1960 |

FOREIGN PATENTS

| | | |
|---|---|---|
| 1,134,348 | France | Dec. 3, 1956 |